(12) United States Patent
Uwani

(10) Patent No.: US 10,026,975 B2
(45) Date of Patent: Jul. 17, 2018

(54) FUEL CELL

(71) Applicant: SUMITOMO PRECISION PRODUCTS CO., LTD., Hyogo (JP)

(72) Inventor: Hiroyuki Uwani, Hyogo (JP)

(73) Assignee: SUMITOMO PRECISION PRODUCTS CO., LTD., Hyogo (JP)

(*) Notice: Subject to any disclaimer, the term of this patent is extended or adjusted under 35 U.S.C. 154(b) by 561 days.

(21) Appl. No.: 14/423,396

(22) PCT Filed: Sep. 3, 2013

(86) PCT No.: PCT/JP2013/005207
§ 371 (c)(1),
(2) Date: Feb. 23, 2015

(87) PCT Pub. No.: WO2014/045530
PCT Pub. Date: Mar. 27, 2014

(65) Prior Publication Data
US 2015/0255812 A1    Sep. 10, 2015

(30) Foreign Application Priority Data

Sep. 21, 2012  (JP) ................. 2012-208109
Aug. 27, 2013  (JP) ................. 2013-175193

(51) Int. Cl.
H01M 8/04   (2016.01)
H01M 8/00   (2016.01)
(Continued)

(52) U.S. Cl.
CPC ....... *H01M 8/04089* (2013.01); *H01M 8/006* (2013.01); *H01M 8/242* (2013.01);
(Continued)

(58) Field of Classification Search
CPC .. H01M 8/04089; H01M 8/241; H01M 8/242; H01M 8/006; H01M 8/2425; H01M 2008/1293; H01M 2008/1095
See application file for complete search history.

(56) References Cited

U.S. PATENT DOCUMENTS

2003/0235749 A1* 12/2003 Haltiner, Jr. ........ H01M 8/0258
                                                              429/446
2004/0110055 A1    6/2004 Baba et al.
(Continued)

FOREIGN PATENT DOCUMENTS

JP    2002-100380 A     4/2002
JP    2002100380   *    5/2002
(Continued)

OTHER PUBLICATIONS

European Patent Office, Extended European Search Report for Application No. 13839226.1, Jul. 7, 2016, 9 pages, Germany.
International Searching Authority, International Search Report (ISR) and Written Opinion for PCT/JP2013/005207, dated Dec. 10, 2013, 7 pages, Japan Patent Office, Japan.

*Primary Examiner* — Ula C Ruddock
*Assistant Examiner* — Matthew W Van Oudenaren
(74) *Attorney, Agent, or Firm* — Alston & Bird LLP

(57) ABSTRACT

Each of a plurality of layered power generation elements (2) of a fuel cell (1) is provided with a plate-shaped cell (10), an anode plate (30), and a cathode plate (20). The anode plate (30) has a fuel intake manifold (4), a plurality of first gas channels (35), and a second gas channel (61). A restricting part (80) for restricting the fuel gas, which flows from the fuel intake manifold (4) through the gas inlet (38) into the second gas channel (61), from flowing into the first gas channel (35) is provided along the surface, opposite the gas inlet (38), of the second gas channel (61).

10 Claims, 13 Drawing Sheets

(51) Int. Cl.
*H01M 8/24* (2016.01)
*H01M 8/04089* (2016.01)
*H01M 8/2483* (2016.01)
*H01M 8/2432* (2016.01)
*H01M 8/242* (2016.01)
*H01M 8/2425* (2016.01)
*H01M 8/1018* (2016.01)
*H01M 8/124* (2016.01)

(52) U.S. Cl.
CPC ....... *H01M 8/2425* (2013.01); *H01M 8/2432* (2016.02); *H01M 8/2483* (2016.02); *H01M 2008/1095* (2013.01); *H01M 2008/1293* (2013.01)

(56) References Cited

U.S. PATENT DOCUMENTS

| | | | |
|---|---|---|---|
| 2006/0204826 A1* | 9/2006 | Borchers | H01M 8/0265 429/444 |
| 2008/0113248 A1* | 5/2008 | Ishikawa | H01M 8/0202 429/482 |
| 2010/0316934 A1 | 12/2010 | Yoshikawa et al. | |

FOREIGN PATENT DOCUMENTS

| | | |
|---|---|---|
| JP | 2002-343376 A | 11/2002 |
| JP | 2006-236612 A | 9/2006 |
| JP | 2008-123750 A | 5/2008 |

\* cited by examiner

FUEL CELL

CROSS REFERENCE TO RELATED APPLICATIONS

This application is a national stage application, filed under 35 U.S.C. § 371, of International Application No. PCT/JP2013/005207, filed Sep. 3, 2013, which claims priority to Japanese Application No. 2012-208109, filed Sep. 21, 2012, and Japanese Application No. 2013-175193, filed Aug. 27, 2013, the contents of all of which as are being hereby incorporated by reference in their entirety.

BACKGROUND

Technical Field

The present invention relates to flat solid oxide fuel cells (SOFCs), and specifically relates to stack structures where separators, etc. are stacked.

Description of Related Art

Fuel cells are devices which can produce electricity by using a fuel. Fuel cells are broadly classified according to types of electrolytes, and include, for example, polymer electrolyte fuel cells (PEFCs) using a polymer thin film, such as resin, as the electrolyte, and solid oxide fuel cells (SOFCs) using a solid oxide as the electrolyte. Among them, SOFCs are recently gaining a growing interest, since having high electrical efficiency.

The SOFCs include a flat type configured by stacking, together with separators and other elements, a plurality of flat cells each having an electrolyte sandwiched between a pair of electrodes. An oxidant gas, such as air or oxygen, and a fuel gas, such as hydrogen and carbon monoxide, are used as a fuel of the SOFCs.

For example, a PEFC is disclosed in Japanese Unexamined Patent Publication No. 2006-236612, and an SOFC is disclosed in Japanese Unexamined Patent Publication No. 2002-343376.

BRIEF SUMMARY

In SOFCs, it is important to evenly supply a fuel gas to electrode surfaces of each of the cells in view of improving the electrical efficiency and increasing the durability.

FIG. 1 illustrates a main part (a cell stack 100) of a block-shaped SOFC configured by stacking planar cells, separators, etc. A collector 101, in which electrode surfaces of the cells are alternately arranged in the stacking direction, is located at a central position of the cell stack 100, and supply manifolds 102 and exhaust manifolds 103 which extend in the stacking direction are provided around the cell stack 100. An oxidant gas (air is used in general) and a fuel gas are supplied to the electrode surfaces of the cells through the supply manifolds 102, and are exhausted through the exhaust manifolds 103.

In the collector, comb-shaped gas passages which allow the gas to flow along each of the both surfaces of a cell from the supply manifold 102 to the exhaust manifold 103 are formed in the separators. The fuel gas or air is divided and supplied to each of the cells through the gas passages.

Each of the gas passages is orthogonal to the vertically-extending supply manifolds 102, and extends so as to laterally expand from the supply manifolds 102. Thus, it is not easy to evenly and stably supply the fuel gas to all of the gas passages. If the fuel gas supply to the gas passages is unstable, it leads to a decline in electrical efficiency or local excess current. Thus, in view of improving the electrical efficiency of the SOFC and increasing the durability, it is important to evenly divide and supply the fuel gas to the entire surfaces of the electrode surfaces.

Patent Document 2 discloses passages which, although directed for use for air, are capable of evenly dividing and supplying the air to electrode surfaces of cells.

In Patent Document 2, as illustrated in FIG. 2(a), a separator on the air electrode side is configured by press-fitting a flat plate 105 and a slit plate 106. Headers 107, 108 for air and fuel are formed in the flat plate 105 so as to pass through the flat plate 105. Headers 108 for fuel, and a plurality of comb-shaped slits 109 are formed in the slit plate 106 so as to pass through the slit plate 106. As illustrate in FIG. 2(b), ends of the slits 109 overlap the headers 107 for air so that air is directly taken in the slits 109 through the headers 107 for air, and is divided and supplied to the electrode surfaces of the cells.

However, in this configuration, the inner area of the air-supplying header 107 is blocked by narrow plate portions between the slits 109 of each slit plate 106, and therefore, smooth flow of the air flowing along the air-supplying header 107 is interrupted, thereby causing pressure loss. Particularly in the SOFC, a plurality of slit plates 106 in general are stacked together, and the airflow is easily affected by this configuration.

In this respect, if the gas is air, material costs are not necessary, and therefore a sufficient amount of air can be supplied to each of the cells by supplying a large amount of air even if the pressure loss is caused. However, if the gas is a fuel gas, material costs are necessary, and therefore the fuel gas cannot be treated like air. In view of running costs, the fuel gas needs to be reduced in its supply amount and be supplied efficiently.

Thus, in this method, it is difficult to stably and evenly supply the fuel gas to the electrode surface of each cell.

The present invention is thus intended to provide a fuel cell that allows a fuel gas to be stably and evenly supplied to an electrode surface of each cell.

A disclosed fuel cell is a fuel cell in which a plurality of power-generating elements are stacked together. The power-generating element includes: a planar cell to one principal surface of which an anode component is connected and to the other principal surface of which a cathode component is connected; an anode plate stacked on the anode component to be electrically connected to the anode component; and a cathode plate stacked on the cathode component to be electrically connected to the cathode component.

The anode plate includes: a fuel supply manifold passing through the anode plate in a stacking direction to form a passage of a fuel gas, and arranged on an outer perimeter of the cell; a plurality of first gas passages arranged across the principal surfaces and extending from a side closer to the fuel supply manifold to a side closer to an end opposite to the fuel supply manifold with respect to the cell; a second gas passage arranged between the fuel supply manifold and the cell so as to extend across the plurality of first gas passages and connect the first gas passages; and a gas intake through which the fuel gas flows from the fuel supply manifold into the second gas passage.

A restricting portion is arranged along an opposed surface of the second gas passage, the opposed surface facing the gas intake, so as to restrict flowing of the fuel gas toward the first gas passages from the second gas passage.

The first gas passages and the restricting portion may be arranged at different heights in the stacking direction of the power-generating elements.

The gas intake and the restricting portion may be arranged at approximately same height in the stacking direction of the power-generating elements.

The fuel cell may further include an insulating plate provided between the anode plate and the cathode plate to electrically insulate therebetween, and having an opening for accommodating the cell, and the cell may be positioned in the power-generating element by making an end face of the cell contact an inner periphery of the opening.

The restricting portion may include the end face of the cell. The opposed surface of the second gas passage, the opposed surface facing the gas intake, may be included in the end face of the cell.

The anode plate may include a first plate provided with a fuel passage hole that forms the fuel supply manifold, a second plate provided with the fuel passage hole and first slits that form the plurality of first gas passages, and a third plate provided with the fuel passage hole, an opening for accommodating the cell, and a notch that forms the gas intake connecting the fuel passage hole and the opening; the fuel passage hole may not be connected with the first slits in a plane of the second plate; and the anode plate may include the first plate, the second plate, and the third plate sequentially stacked together such that the fuel passage holes of the respective plates are connected together in the stacking direction.

Further, the anode plate may include a first plate provided with a fuel passage hole that forms the fuel supply manifold, a second plate provided with the fuel passage hole and first slits that form the plurality of first gas passages, and a third plate provided with the fuel passage hole, an opening for accommodating the cell, a second slit that is arranged between the fuel passage hole and the opening and forms the second gas passage, and a notch that forms the gas intake connecting the fuel passage hole and the second slit; the fuel passage hole may not be connected with the first slits in a plane of the second plate; the second slit may not be connected with the opening in a plane of the third plate; and the anode plate may include the first plate, the second plate, and the third plate sequentially stacked together such that the fuel passage holes of the respective plates are connected together in the stacking direction.

Furthermore, the anode plate may include a first plate provided with a fuel passage hole that forms the fuel supply manifold, a second plate provided with the fuel passage hole, a notch that is connected with the fuel passage hole and forms the gas intake, and first slits that form the plurality of first gas passages, and a third plate provided with the fuel passage hole, an opening for accommodating the cell, and a second slit that is arranged between the fuel passage hole and the opening and forms the second gas passage; the first slits may not be connected with the fuel passage hole and the notch in a plane of the second plate; the fuel passage hole, the second slit, and the opening may not be connected with each other in a plane of the third plate; and the anode plate may include the first plate, the second plate, and the third plate sequentially stacked together such that the fuel passage holes of the respective plates are connected together in the stacking direction.

Furthermore, the anode plate may include a first plate provided with a fuel passage hole that forms the fuel supply manifold, a second plate provided with the fuel passage hole, a notch that is connected with the fuel passage hole and forms the gas intake, and first slits that form the plurality of first gas passages, and a third plate provided with the fuel passage hole and an opening for accommodating the cell; the first slits may not be connected with the fuel passage hole and the notch in a plane of the second plate; the fuel passage hole may not be connected with the opening in a plane of third plate; and the anode plate may include the first plate, the second plate, and the third plate sequentially stacked together such that the fuel passage holes of the respective plates are connected together in the stacking direction.

The present invention is capable of providing a fuel cell which allows a fuel gas to be stably and evenly supplied to an electrode surface of each cell, even if a plurality of cells are stacked together.

DETAILED DESCRIPTION OF VARIOUS EMBODIMENTS

An embodiment of the present invention will be described in detail based on the drawings. The following embodiment is merely a preferred example in nature, and is not intended to limit the scope, applications, and use of the invention.

Figure 1:
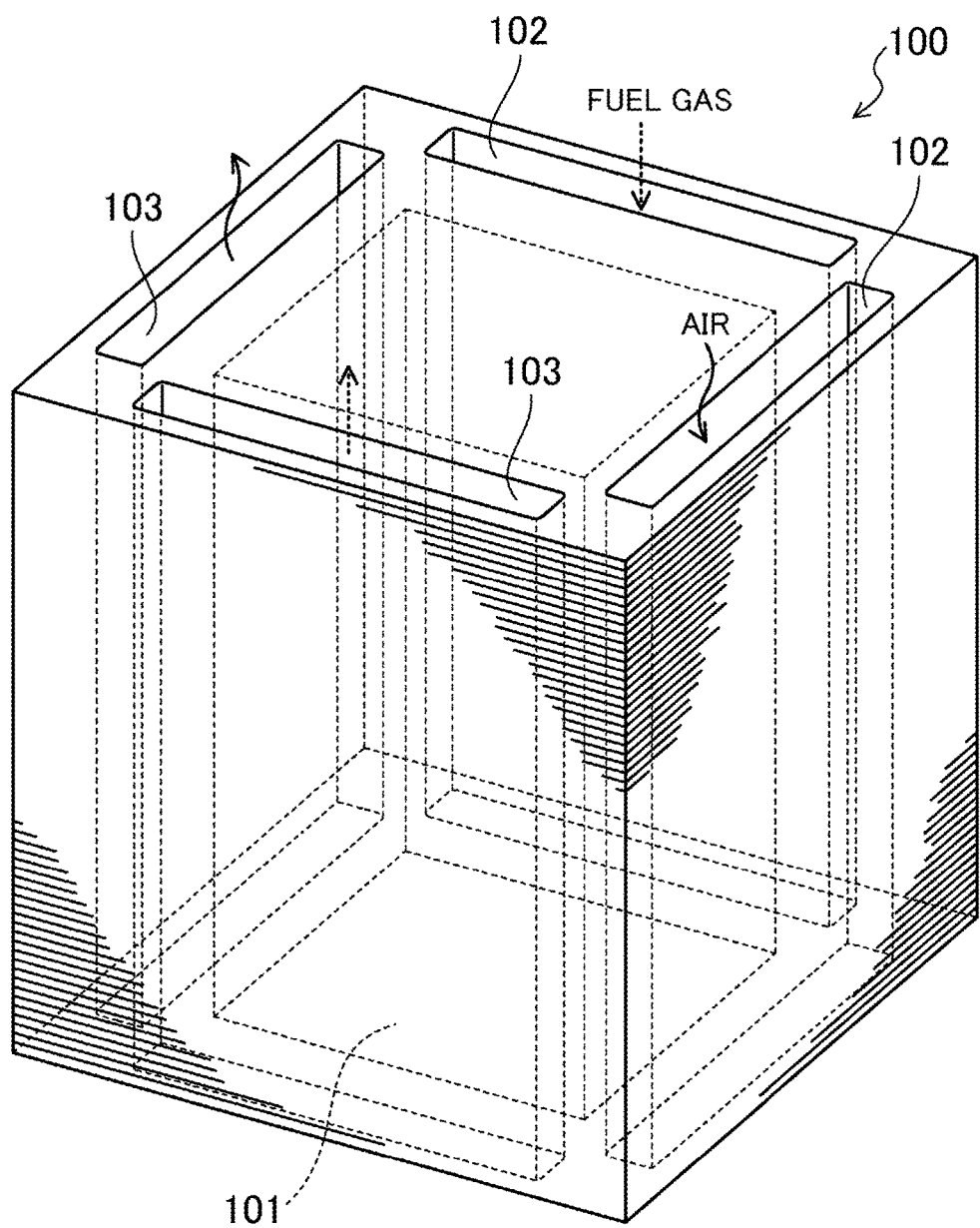
FIG. 1 schematically illustrates a perspective view of an example conventional fuel cell.
Figure 2A:
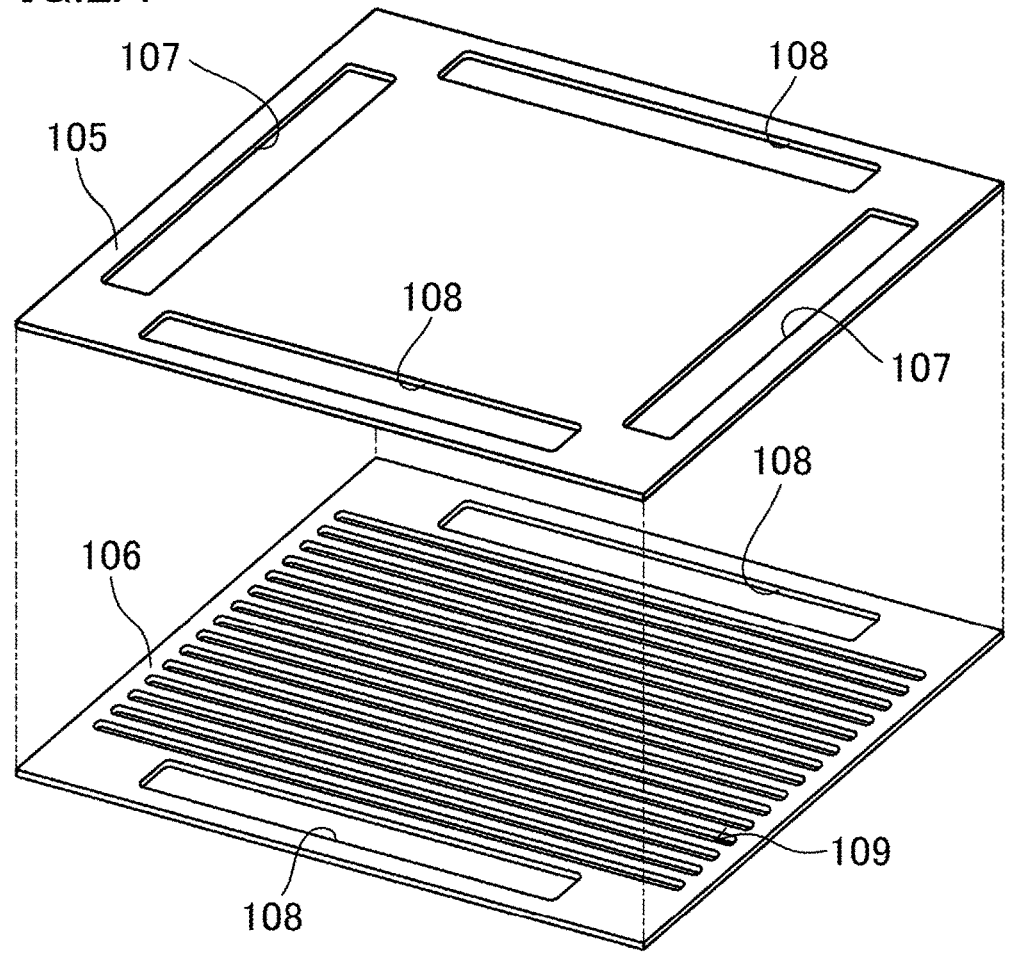
FIG. 2(*a*) and FIG. 2(*b*) schematically illustrate perspective views of an example air passage of a conventional fuel cell.
Figure 2B:
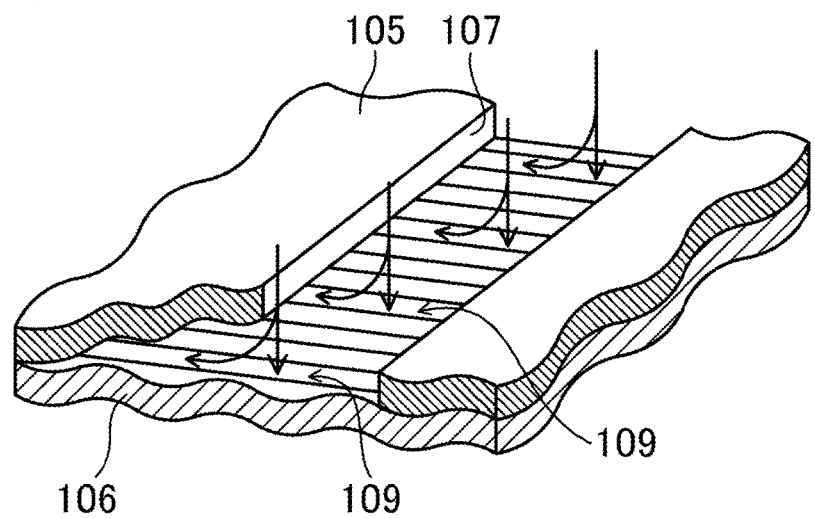
Figure 3:
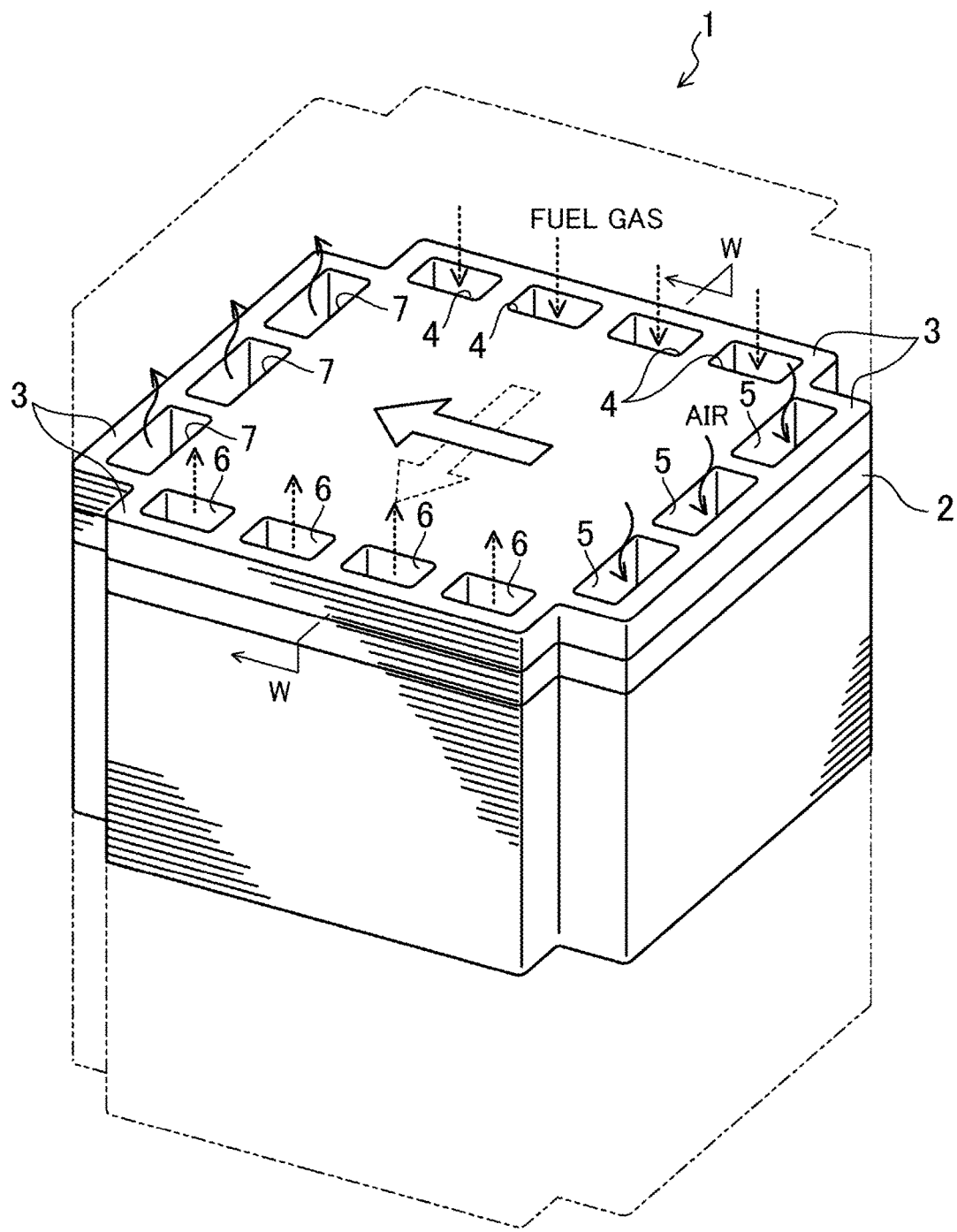
FIG. 3 schematically illustrates a perspective view of a fuel cell of an embodiment.

FIG. 3 illustrates a fuel cell of the present embodiment. The fuel cell is a flat-plate solid oxide fuel cell (also called a SOFC), and a main part (a cell stack 1) thereof is configured by repeatedly stacking, in a columnar shape, a plurality of power-generating elements 2 each having a power-generating function.

The outline of this SOFC in plan view from a stacking direction is an approximately cross-like figure, with an extended portion 3 slightly extending from each of four sides of a rectangle. The outline of the SOFC is not limited to the cross-like figure, and may be appropriately changed to a rectangle, a circle, and other figures, according to a specification.

Manifolds 4, 5, 6, 7 which extend in the stacking direction and form passages for supplying a fuel gas and air (an example of an oxidant gas) to each of the power-generating elements 2 are formed at the sides of the cell stack 1. Specifically, fuel gas supply manifolds 4 (fuel supply manifolds) and exhaust manifolds 6 are formed separately in the pair of extended portions 3, 3 opposed to each other, and air supply manifolds 5 and exhaust manifolds 7 are formed separately in the other pair of extended portions 3, 3.

In this SOFC, three air supply manifolds 5 and three exhaust manifolds 7, all of which are vertically-elongated holes arranged along the respective sides, and four fuel gas supply manifolds 4 and four exhaust manifolds 6, all of which are vertically-elongated holes arranged along the respective sides. The manifolds' configuration is not limited thereto, and the number and the shape thereof may be appropriately changed according to specifications.

The air flows in each of the power-generating elements 2 from the supply manifolds 5 to the exhaust manifolds 7 as indicated by white arrow in solid line. The fuel gas flows in each of the power-generating elements 2 in a direction orthogonal to the flow of the air, as indicated by white arrow in broken line.

In the power-generating elements 2, power is generated by utilizing the air and the fuel gas. In the SOFC, a plurality of power-generating elements 2 are stacked together to generate high power.

(Power-Generating Element)

Figure 4:
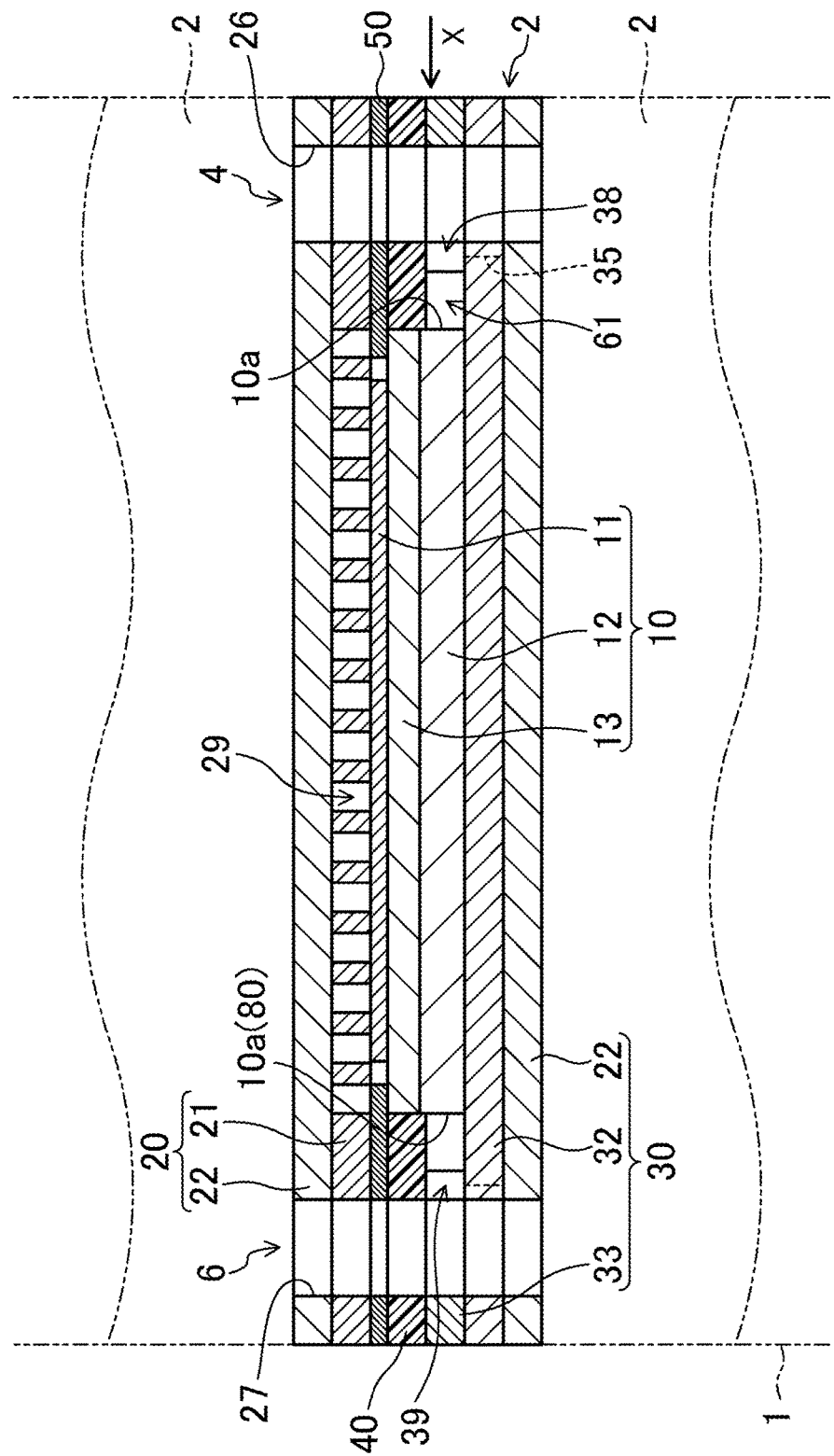
FIG. 4 schematically illustrates a cross-sectional view of a power-generating element taken along the line W-W shown in FIG. 3.
Figure 5:
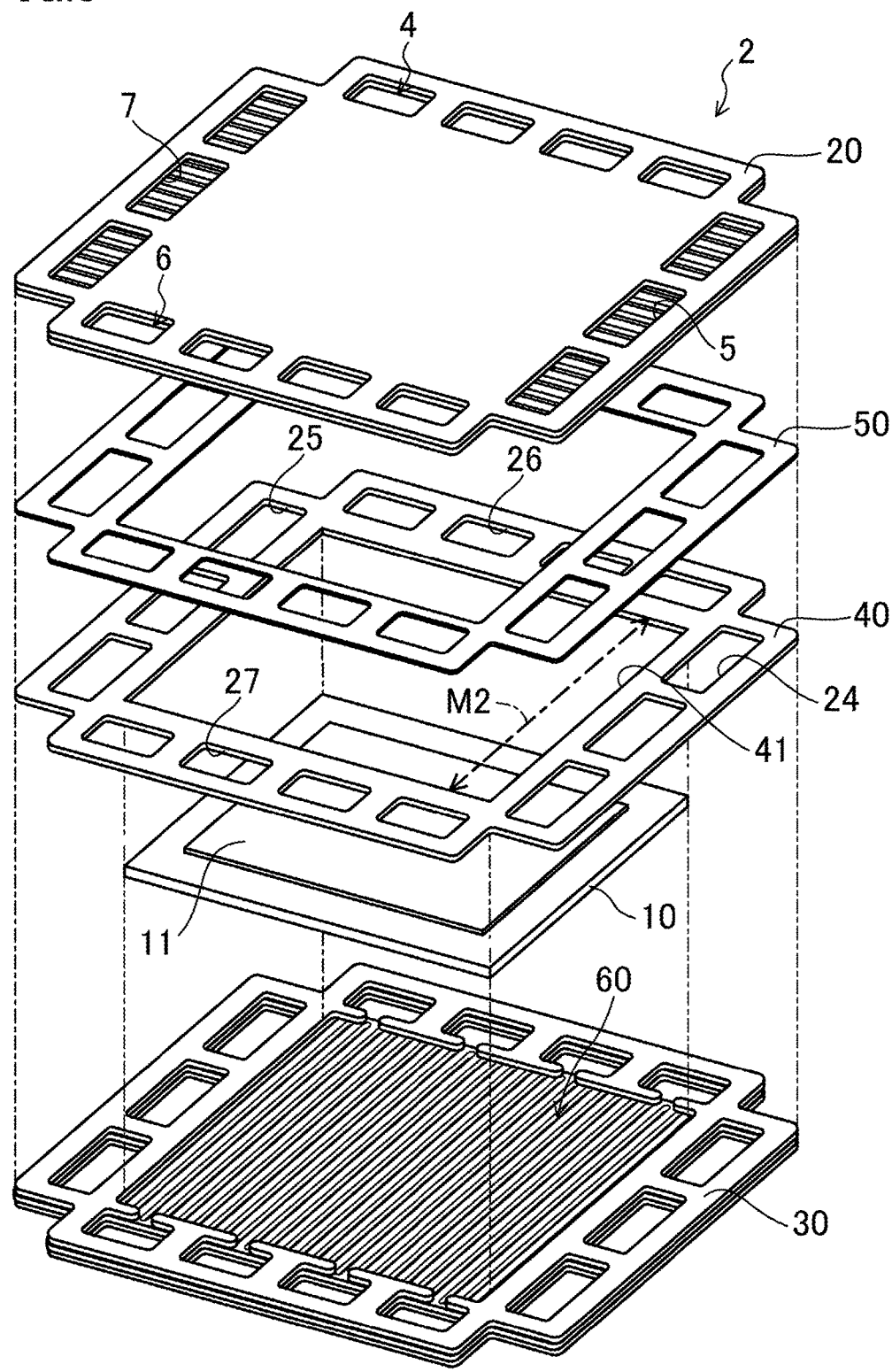
FIG. 5 schematically illustrates an exploded perspective view of a power-generating element.

FIG. 4 and FIG. 5 illustrate the power-generating element 2 in detail.

The power-generating element 2 includes a cell 10, a cathode plate 20, an anode plate 30, an insulating plate 40, a sealing member 50, etc. The anode plate 30 and the cathode plate 20 stacked together, with the insulating plate 40 interposed therebetween. A rectangular shaped cell holding space 60 in plan view is formed in between the anode plate 30 and the cathode plate 20 stacked together.

The cell 10 is a rectangular planar member that is fitted in the cell holding space 60. The cell 10 is configured by a cathode component 11 (an air electrode), an anode component 12 (a fuel electrode), and a solid-state electrolyte 13 provided between the cathode component 11 and the anode component 12 and made of yttria-stabilized zirconia, etc. The plate thickness of the cell 10 is about 0.5 mm to 1 mm.

The cathode component 11 made of a rectangular thin film layer slightly smaller than the cell 10 is located on one surface (a principal surface) of the cell 10. The anode component 12 is a rectangle almost the same size as the cell 10, and is located on the other surface (a principal surface) of the cell 10. When the cell 10 is fitted in the cell holding space 60, the cathode component 11 is in tight contact with the cathode plate 20, and the anode component 12 is in tight contact with the anode plate 30.

As a result, the cathode plate 20 is electrically connected to the cathode component 11, and the anode plate 30 is electrically connected to the anode component 12.

Figure 6:
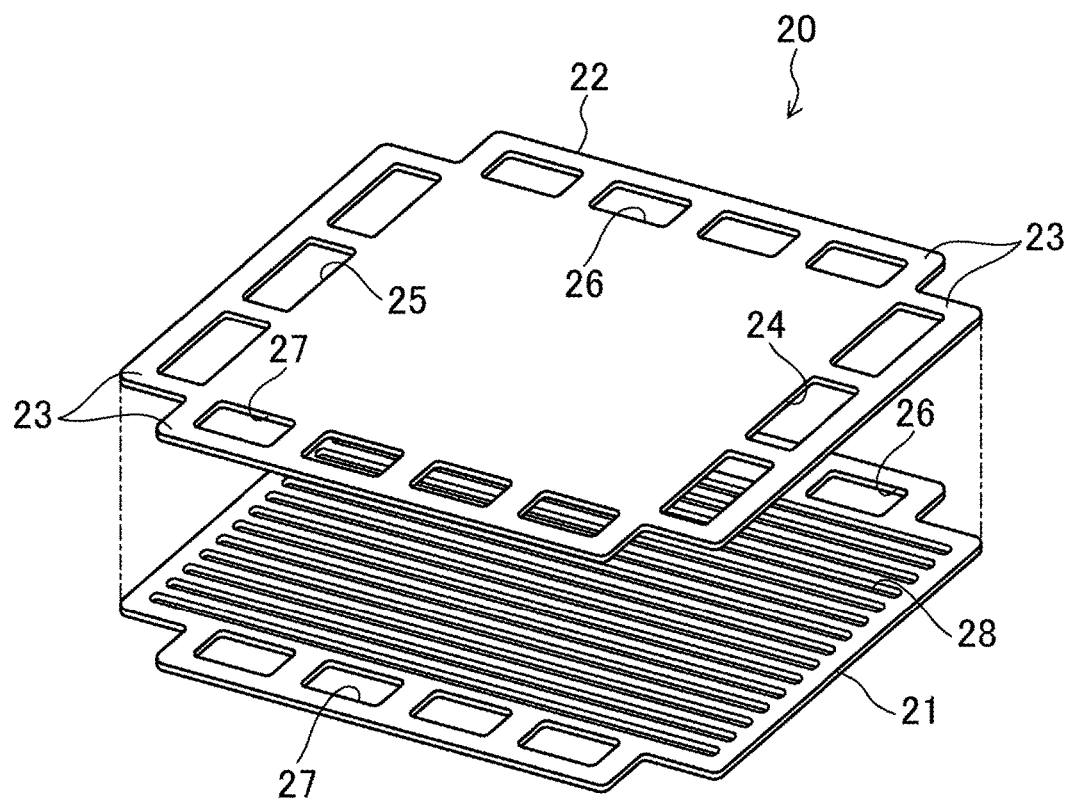
FIG. 6 schematically illustrates an exploded perspective view of a cathode plate.

As illustrated in detail in FIG. 6, the cathode plate 20 is configured by stacking the following two plates: an electrode-side plate 21 and a separator plate 22. Specifically, both of the electrode-side plate 21 and the separator plate 22 are obtained by pressing rolled ferrite stainless having high thickness accuracy, and have an approximately cross-like outline shape having the same dimensions, with flanges 23 forming the extended portions 3 extending in four directions.

The separator plate 22 is a flat plate member, and each of the flanges 23 thereof is provided with only air supply holes 24 and air exhaust holes 25, which respectively form the supply manifolds 5 and the exhaust manifolds 7, and fuel supply holes 26 (fuel passage holes) and fuel exhaust holes 27, which respectively form the supply manifolds 4 and the exhaust manifolds 6.

The electrode-side plate 21 is not provided with the air supply hole 24 and the air exhaust hole 25, and provided with the fuel supply holes 26, the fuel exhaust holes 27, and a plurality of slits 28. The slits 28 are adjacent to each other and extend in parallel with the sides where the fuel supply holes 26 and the fuel exhaust holes 27 are formed. The slits 28 are arranged in the entire portion between the fuel supply holes 26 and the fuel exhaust holes 27. Ends of the slits 28 overlap the air supply holes 24 and the air exhaust holes 25 when the electrode-side plate 21 and the separator plate 22 are stacked together.

By stacking the electrode-side plate 21 on the separator plate 22 and closing openings on one side of the slits 28, air passages 29 comprised of a group of narrow grooves are formed in the cathode plate 20. The surface of the electrode-side plate 21 where the air passages 29 are formed is brought into tight contact with the cathode component 11 of the cell 10.

Figure 7:
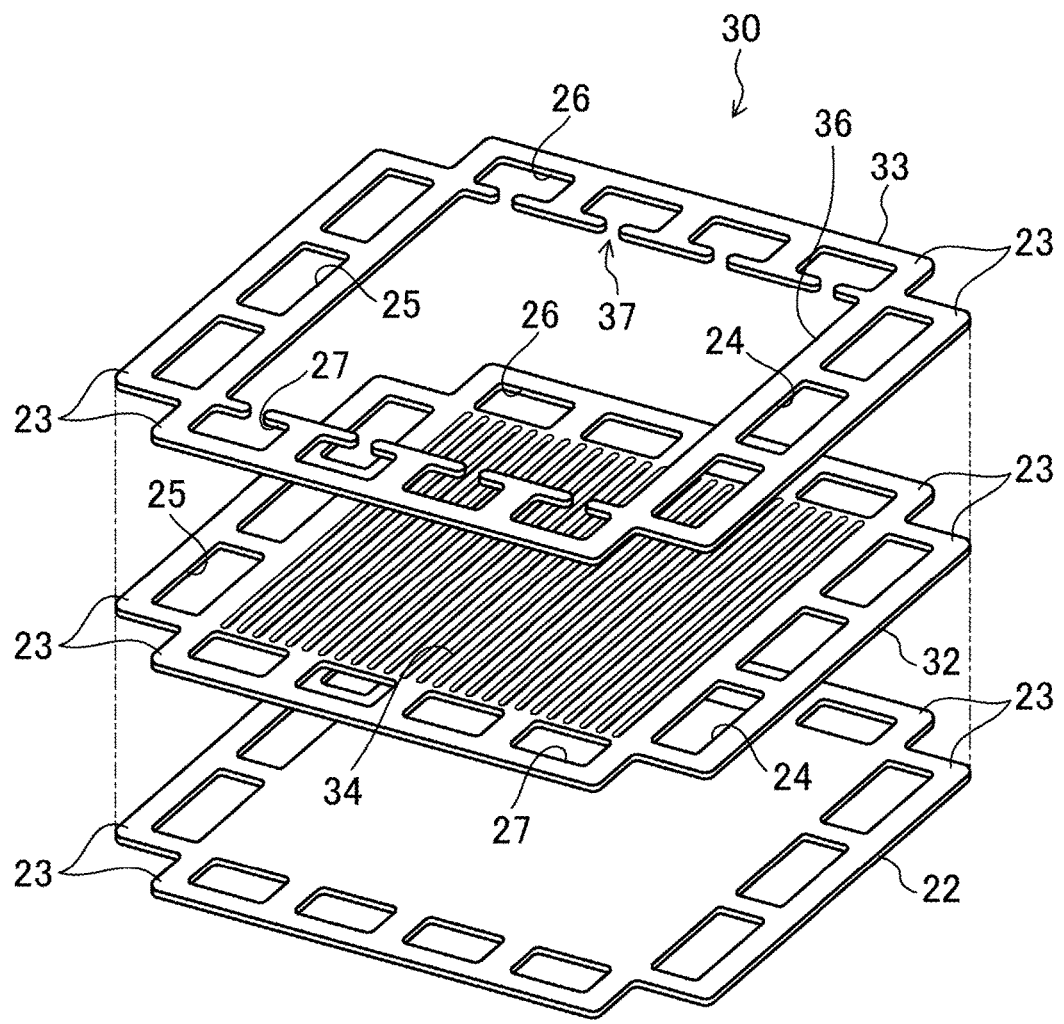
FIG. 7 schematically illustrates an exploded perspective view of an anode plate.

As illustrated in detail in FIG. 7, the anode plate 30 is configured by sequentially stacking the following three plates: a separator plate 22 (a first plate), a separator-side plate 32 (a second plate), and an electrode-side plate 33 (a third plate). Like the cathode plate 20, all of these plates are formed of rolled ferrite stainless having high thickness accuracy, and have an approximately cross-like outline shape, with flanges 23 extending in four directions.

As identified by the same character, the separator plate 22 is the same as the separator plate 22 of the anode plate 30. In this SOFC, the cathode plate 20 and the anode plate 30 share one separator plate 22. That is, the separator plate 22 in FIG. 6 is the separator plate 22 of the anode plate 30 for the power-generating element 2 located thereover, and the separator plate 22 in FIG. 7 is the separator plate 22 of the cathode plate 20 for the power-generating element 2 located thereunder.

The separator-side plate 32 is provided with air supply holes 24, air exhaust holes 25, fuel supply holes 26, and fuel exhaust holes 27, and further, at its central portion, with a plurality of slits 34 (first slits). The slits 34 are adjacent to each other and extend in parallel from the fuel supply holes 26 to the fuel exhaust holes 27. The slits 34 are arranged in the entire portion between the air supply holes 24 and the air exhaust holes 25. Different from the ends of the slits 28 in the electrode-side plate 21 of the cathode plate 20, ends of the slits 34 are located near the fuel supply holes 26 and the fuel exhaust holes 27. The fuel supply holes 26 are not connected with the slits 34 in the plane of the separator-side plate 32.

By stacking the separator-side plate 32 on the separator plate 22 and closing openings on one side of the slits 34, gas passages 35 (first gas passages) comprised of a group of narrow grooves are formed in the anode plate 30. The surface of the separator-side plate 32 where the gas passages 35 are formed is brought into tight contact with the anode component 12 of the cell 10. The fuel gas flows along the entire surface of the anode component 12 through the gas passages 35.

The electrode-side plate 33 is provided with air supply holes 24, air exhaust holes 25, fuel supply holes 26, fuel exhaust holes 27, a cell opening 36, and notches 37. The cell opening 36 is a rectangular opening which forms the cell holding space 60, and is located at a central portion of the electrode-side plate 33. Each notch 37 is formed by cutting a portion between the cell opening 36 and a corresponding one of the fuel supply holes 26 and a corresponding one of the fuel exhaust holes 27. The notch 37 has a constricted throat portion 37a in the middle, and gradually opens wider toward the fuel supply hole 26 and toward the cell opening 36 (see FIG. 10).

In this SOFC, the notches 37 are formed at four locations apart from each other. Each of the notches 37 forms a pore-like gas intake 38 which connects the cell holding space 60 and the supply manifold 4, by stacking the electrode-side plate 33 in between the separator-side plate 32 and the insulating plate 40.

Since in this SOFC, the anode plate 30 and the cathode plate 20 are formed by stacking pressed objects made of rolled stainless, the SOFC has a superior thickness accuracy. Thus, the depth dimensions of the air passage 29, the gas passage 35, the cell holding space 60, the gas intake 38, etc., are highly accurate without an advanced technique.

The insulating plate 40 is a plate member made of a material having superior insulating properties, such as mica. As shown in FIG. 5, the insulating plate 40 has the same outline shape as the outline shapes of the cathode plate 20 and the anode plate 30. The insulating plate 40 is provided with air supply holes 24, air exhaust holes 25, fuel supply holes 26, and fuel exhaust holes 27, and an opening 41 for accommodating the cell 10 in a central portion thereof. The insulating plate 40 is located between the electrode-side plate 33 of the anode plate 30 and the electrode-side plate 21 of the cathode plate 20.

The sealing member 50 is located between the electrode-side plate 21 of the cathode plate 20 and the insulating plate 40 to reliably block a fuel gas flow and airflow. Thus, a gap between the cell 10 and the insulating plate 40 is sealed by the sealing member 50.

The dimension of the cell holding space 60 (the cell opening 36) is larger than that of the cell 10.

Figure 8:
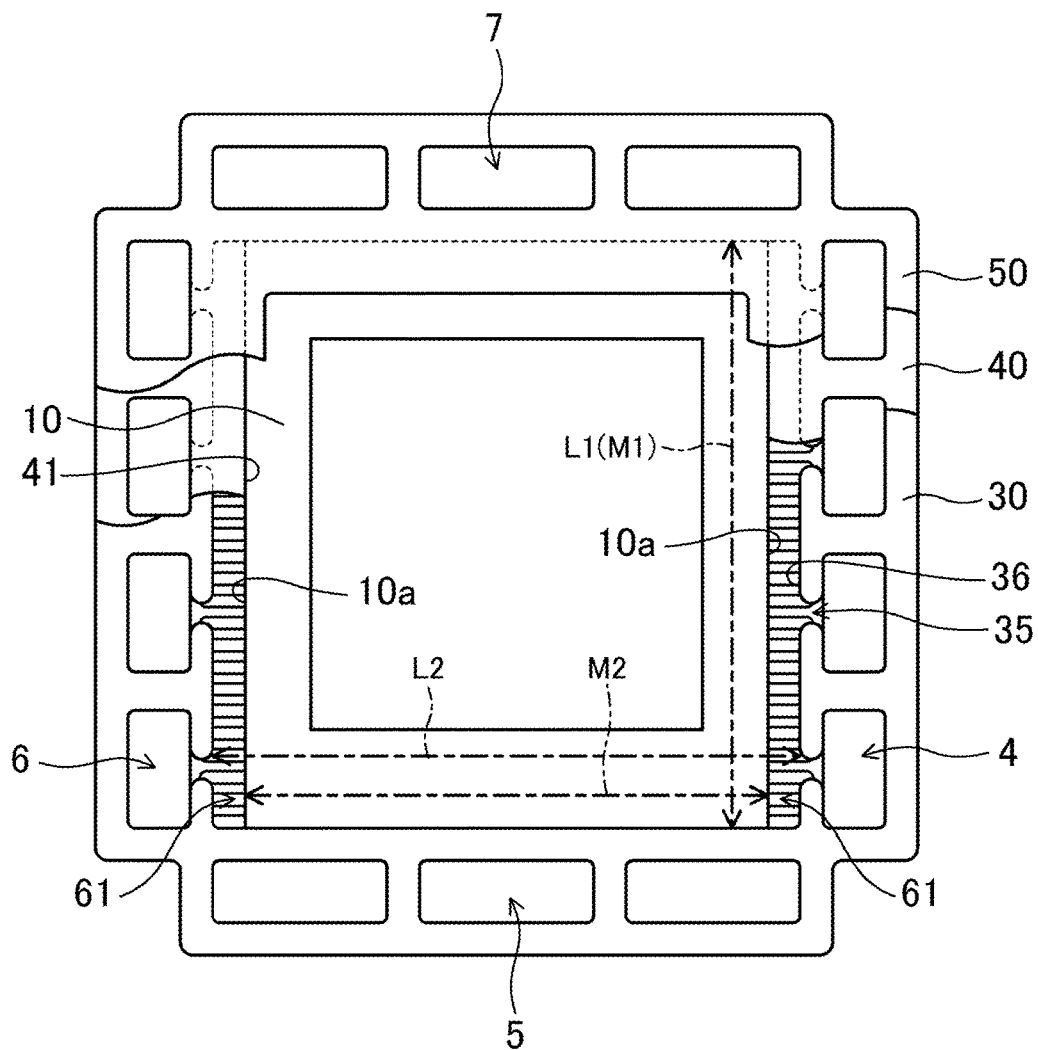
FIG. 8 is a view for explaining positioning of a cell.

As shown in FIG. 8, in the space between the air supply manifold 5 and the exhaust manifold 7, the linear dimension L1 (the inner size) of the holding space 60 is approximately the same as the linear dimension M1 (the outer size) of the cell 10 so that the cell 10 can be fitted in the cell holding space 60 without a gap therebetween. In contrast, in the space between the fuel gas supply manifold 4 and the exhaust manifold 6, the linear dimension L2 of the cell holding space 60 is larger than the linear dimension M2 of the cell 10.

Thus, when the cell 10 is fitted in the cell opening 36 of the anode plate 30, the end face 10a of the cell 10 partitions the cell holding space 60, allowing a space (i.e., buffer space 61, which is an example second gas passage) to be formed in the cell holding space 60 on the side closer to the fuel gas supply manifold 4.

In this SOFC, to stably provide the highly-accurate buffer space 61, the cell 10 is positioned at a predetermined location in the cell holding space 60, using the insulating plate 40. Specifically, in the opening 41 of the insulating plate 40, the space between the fuel gas supply manifold 4 and the exhaust manifold 6 has a linear dimension M2 that is approximately the same as the linear dimension of the cell 10, and smaller than the linear dimension of the cell holding space 60.

Thus, by merely allowing the cell 10 which has been fitted in the cell opening 36 of the anode plate 30, to be fitted in the opening 41, and stacking the insulating plate 40 on the anode plate 30 with their outlines meeting each other, the inner periphery of the opening 41 is brought into contact with the end face 10a of the cell 10, and it is possible to position the cell 10 with high accuracy.

As a result, the end face 10a of the cell 10 can be as close as possible to the inner periphery of the cell opening 36, while reliably forming the buffer space 61 in the cell holding space 60 on the side closer to the fuel gas supply manifold 4. By bringing the end face 10a of the cell 10 close to the inner periphery of the cell opening 36, it is possible to downsize the fuel cell, and evenly divide and supply the fuel gas to all of the gas passages 35.

In this SOFC, the cell 10 is positioned such that the buffer spaces 61 having the same dimensions are formed on both sides of the cell 10 closer to the fuel gas supply manifold 4 and closer to the exhaust manifold 6.

One side of the buffer space 61 on the side closer to the supply manifold 4 is partitioned by the end face 10a of the cell 10, and the opposite side thereof is partitioned by the inner periphery of the cell opening 36 where the gas intakes 38 are present. The upper face of the buffer space 61 is partitioned by the insulating plate 40, and the lower face thereof is partitioned by the surface of the separator-side plate 32 of the anode plate 30. Since the buffer space 61 extends across all the gas passages 35 formed in the surface of the separator-side plate 32, ends of the gas passages 35 are exposed in the buffer space 61.

In view of workability in assembly, the structure, such as a gas outlet 39, on the side closer to the exhaust manifold 6 is symmetrical to the structure on the side closer to the supply manifold 4.

(Intake of Fuel Gas to Power-Generating Element)

Figure 9:
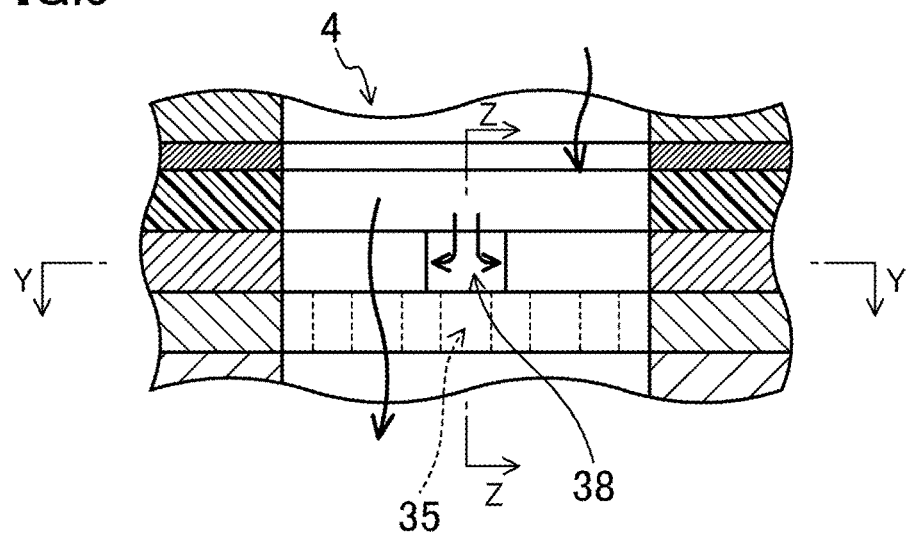
FIG. 9 is a schematic view from arrow X in FIG. 4.
Figure 10:
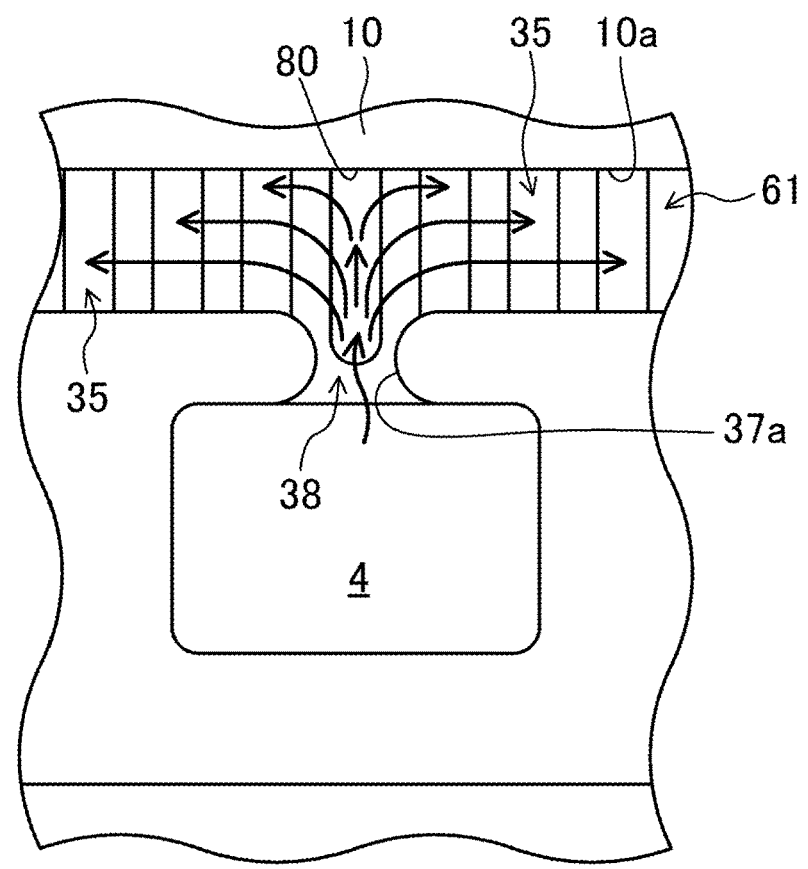
FIG. 10 schematically illustrates a cross-section taken along the line Y-Y shown in FIG. 9.
Figure 11:
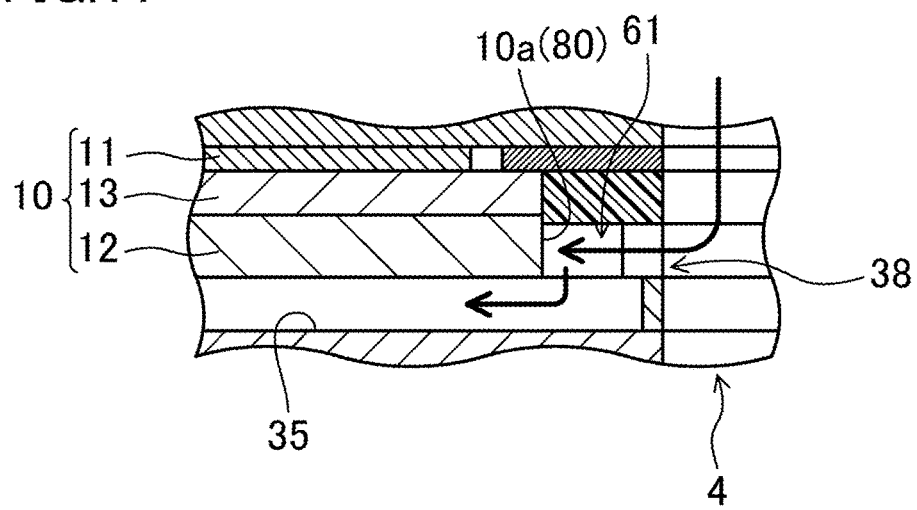
FIG. 11 schematically illustrates a cross-section taken along the line Z-Z shown in FIG. 9.

FIG. 9 is a schematic view of around the gas intake 38 from arrow X in FIG. 4. FIG. 10 schematically illustrates a cross-section taken along the line Y-Y shown in FIG. 9. FIG. 11 schematically illustrates a cross-section taken along the line Z-Z shown in FIG. 9.

As illustrated in FIG. 9, the gas intake 38 is open to a side surface of the supply manifold 4, and the fuel gas flowing in the supply manifold 4 flows into the gas intake 38 because of an effect of differential pressure. Unlike the air supply manifold 5, the supply manifold 4 does not have anything that can serve an obstacle to the fuel gas flow, and therefore, there is not a possibility of pressure loss in the supply manifold 4. Thus, the fuel gas can be guided evenly into the gas intakes 38 of the respective power-generating elements 2.

As illustrated in FIG. 10, the fuel gas flowing into the buffer space 61 through the gas intake 38 is restricted in its flowing into the gas passages 35 by a restricting portion 80 along an opposed surface facing the gas intake 38. The restricting portion 80 has a function of restricting the fuel gas flow into the gas passages 35.

Specifically, in the present embodiment, since the gas intake 38 faces the end face 10a of the cell 10, the end face 10a of the cell 10 forms the opposed surface. Of the end face 10a of the cell 10, a portion which faces the gas intake 38 forms the restricting portion 80. The gas intake 38 and the restricting portion 80 are positioned at an approximately same height in the stacking direction.

The fuel gas flowing in the gas intake 38 collides with the opposed end face 10a of the cell 10, and is horizontally dispersed in the buffer space 61. Thus, even if the buffer space 61 extends horizontally, the fuel gas can spread across the buffer space 61, and it is possible to reduce uneven distribution of the fuel gas in the buffer space 61.

As illustrated in FIG. 11, since the gas passages 35 and the restricting portion 80 are positioned at different heights in the stacking direction, and the ends of the gas passages 35 exposed to the bottom face of the buffer space 61 are open in a direction orthogonal to the direction of the fuel gas flowing into the buffer space 61, the gas passages 35 and the restricting portion 80 are not much affected by the fuel gas flow. Thus, the fuel gas dispersed in the buffer space 61 flows into each of the narrow grooves of the laterally-arranged gas passages 35, without flowing unevenly. As a result, the fuel gas can be evenly divided and supplied to the entire surface of the anode component 12.

(Summary of Embodiment)

The fuel cell of the present embodiment is a so-called flat solid oxide fuel cell (a SOFC) in which a plurality of power-generating elements are stacked together.

Each of the power-generating elements includes a rectangular planar cell, an anode plate and a cathode plate which, by being stacked on each other, form therein a cell holding space where the cell is fitted, and an insulating plate provided between the anode plate and the cathode plate to provide insulation between the anode plate and the cathode plate.

A supply manifold and an exhaust manifold, both passing through in the stacking direction, are independently formed on opposing sides of the anode plate and the cathode plate stacked together. A linear dimension of the cell holding space between the supply manifold and the exhaust manifold is larger than the linear dimension of the cell. The cell holding space is partitioned by an end face of the cell, thereby forming a buffer space on the side closer to the supply manifold of the power-generating element.

A gas intake connecting with the buffer space and the supply manifold is formed so as to face the end face of the cell. A gas passage where the fuel gas flows along a surface of the cell is formed in the anode plate. An end of the gas passage is exposed in the buffer space.

In short, in this fuel cell, a cell holding space is formed in between the anode plate and the cathode plate stacked together, with an insulating plate interposed therebetween, and in this cell holding space, a rectangular planar cell is fitted. The linear dimension of the cell holding space between supply manifolds and exhaust manifolds, which are formed separately on opposing sides and though which the fuel gas flows, is larger than a linear dimension of the cell, and using this difference in dimensions, a buffer space is formed on the side closer to the supply manifolds of the power-generating element.

A gas intake is formed so as to face the end face of the cell which partitions the buffer space, and ends of the gas passages formed in the anode plate are exposed in the buffer space.

In this fuel cell, fuel gas is supplied to each power-generating element from the supply manifolds through the gas intake. Since it is not necessary to provide additional elements which serve as obstacles in the supply manifolds, a smooth flow of the fuel gas along the supply manifolds is ensured, and almost no pressure loss occurs. Thus, even if multiple power-generating elements are stacked together, the fuel gas can be evenly supplied to each of the power-generating elements.

In the power-generating elements, the fuel gas is not directly taken into the gas passages from the supply manifolds, but is taken into the gas passages through the buffer space extending to the same length as the width of the cell. The fuel gas is diffused in the buffer space, and thereafter flows in the gas passages. Thus, the fuel gas supplied to each of the power-generating elements can be evenly divided and supplied to all of the gas passages, and can have uniform influence on the entire electrode surface of the cell.

In addition, the buffer space can be formed to highly-accurate dimensions by simply shifting the cell fitted in the cell holding space. Thus, productivity is also improved.

In particular, the insulating plate has an opening for accommodating the cell, and the cell is positioned in the cell holding space by making the inner periphery of the opening contact the end face of the cell.

As a result, the insulating plate provides highly-accurate positioning of the cell. Thus, the end face of the cell can be as close as possible to the inner periphery of the cell holding space, while ensuring the buffer space with reliability.

The closer the end face of the cell to the inner periphery of the cell holding space, the smaller the size of the fuel cell can be. Further, since the gas intake faces the end face of the cell, the fuel gas flowing into the gas intake collides with the end face of the cell with a greater force, with a decreasing distance of the end face of the cell to the inner periphery of the cell holding space. As a result, the fuel gas is dispersed more efficiently in the buffer space.

Further, the anode plate includes a first plate provided with fuel passage holes that form the supply manifolds and the exhaust manifolds, a second plate provided with the fuel passage holes and slits that form the gas passages, and a third plate provided with the fuel passage holes, an opening that forms the cell holding space, and notches that form the gas intakes. The anode plate is formed by sequentially stacking the first plate, the second plate, and the third plate.

As a result, the gas passages, the cell holding space, and the gas intakes can be obtained with high dimensional accuracy by etching or pressing working, without advanced and complicated techniques. Thus, passages which allow the fuel gas to be evenly divided and supplied to the respective electrode surfaces of the cells can be stably obtained with low costs.

(First Variation)

Figure 13:
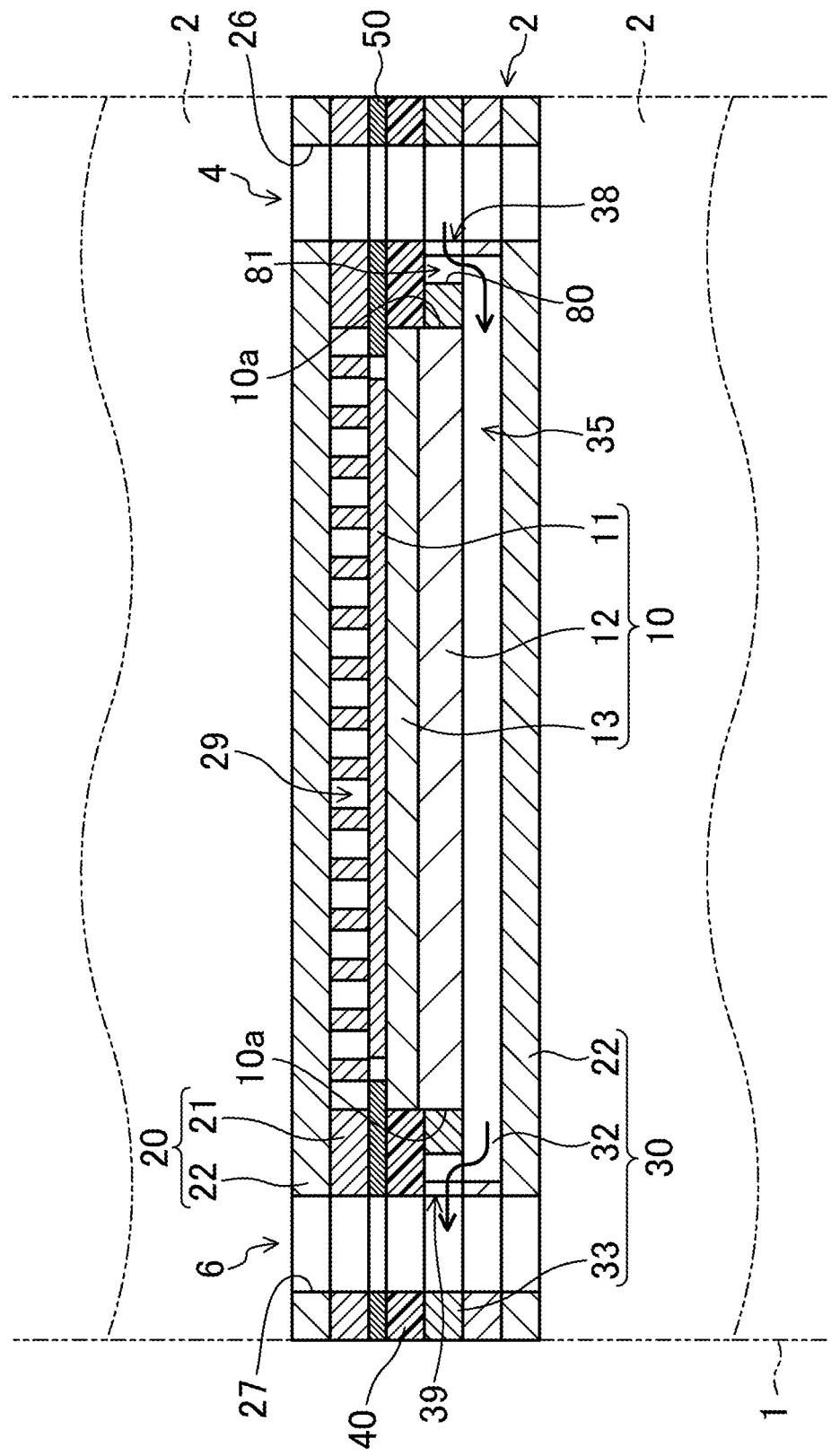
FIG. 13 illustrates a fuel cell of the first variation and is equivalent to FIG. 4. The gas passage is simply illustrated.

FIG. 13 illustrates a first variation of the fuel cell.

In the above embodiment, the dimension of the cell holding space 60 is larger than the dimension of the cell 10, so that the second gas passage is formed in the cell holding space 60 on the side closer to the fuel gas supply manifold 4.

On the other hand, in the present variation, the dimension of the cell holding space 60 is approximately the same as the dimension of the cell 10, and the second gas passage is formed by changing the shape of the electrode-side plate 33.

The basic structures in the present variation are the same as those in the above embodiment. Thus, differences will be explained, and the same reference characters are used to designate the same members and the same structures, and explanation thereof is omitted. The same will be applied to the second and third variations which will be described later.

As illustrated in FIG. 13, the fuel cell of the present variation is designed such that the cell opening 36 of the electrode-side plate 33 has the same dimensions as the opening 41 of the insulating plate 40, and such that the opening 41 and the cell opening 36 overlap each other without a step on the inner periphery. Thus, in the present variation, the cell 10 is fitted in the opening 41 of the insulating plate 40 and the cell holding space 60 (i.e., the cell opening 36) without a gap, with the inner peripheries of the opening 41 and the cell opening 36 contacting the end face 10a of the cell 10, thereby providing highly-accurate positioning of the cell 10.

The electrode-side plate 33 is provided with a long hole 81 (a second slit) extending along a side edge, at a portion between the fuel supply holes 26 (i.e., the supply manifolds 4) and the cell opening 36. Notches 37 connecting the long hole 81 and the fuel supply holes 26 are formed at a portion between the long hole 81 and the fuel supply holes 26.

The electrode-side plate 33 and other elements are stacked together, and thereby the long hole 81 forms the second gas passage, and the notches 37 forms the gas intakes 38. The long hole 81 (i.e., the second gas passage) extends across all the gas passages 35, and the ends of the gas passages 35 are exposed to the bottom face of the long hole 81.

In this case, the fuel supply holes 26 are not connected with the slits 34 (i.e., the gas passages 35) in the plane of the separator-side plate 32, and the long hole 81 is not connected with the cell opening 36 in the plane of the electrode-side plate 33.

Thus, the fuel gas flowing in the long hole 81 through the gas intake 38 is restricted in its flowing into the gas passage 35 by a side face portion (a restricting portion 80) of the long hole 81 which faces the gas intake 38, as indicated by arrow in FIG. 13. The fuel gas is dispersed in the horizontal direction in the long hole 81, and thereafter flows into the respective gas passages 35.

(Second Variation)

Figure 14:
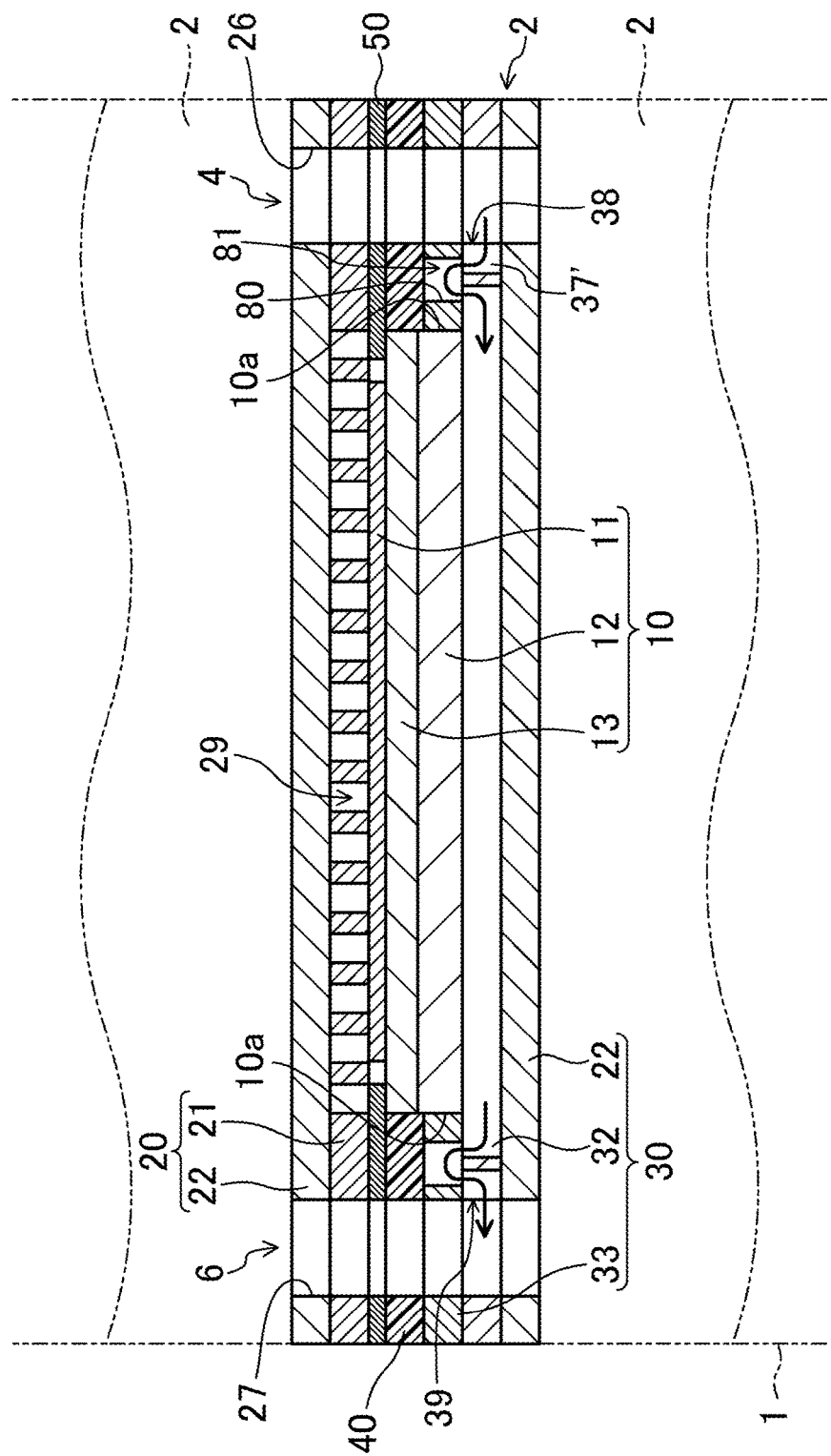
FIG. 14 illustrates a fuel cell of the second variation and is equivalent to FIG. 4. The gas passage is simply illustrated.

FIG. 14 illustrates a second variation of the fuel cell.

In the first variation, the gas intakes 38 are formed in the plane of the electrode-side plate 33, whereas in the present variation, the gas intakes 38 are formed in the plane of the separator-side plate 32.

In the separator-side plate 32 of the present variation, notches 37' (which correspond to the notches 37) that form the gas intakes 38 are formed on the side edge of the fuel supply hole 26 closer to the gas passages 35. The notches 37' are formed such that part of the side edge closer to the gas passages 35 is recessed to face the gas passages 35.

The fuel supply holes 26, that is, the fuel gas supply manifolds 4, are connected with the gas passages 35 through the gas intakes 38 and the long hole 81. In this case, in the plane of the separator-side plate 32, the slits 34 (i.e., the gas passages 35) are not connected with the fuel supply holes 26 and the notches 37' (i.e., the gas intakes 38), and in the plane of the electrode-side plate 33, none of the fuel supply holes 26, the long hole 81, and the cell opening 36 are connected together.

In the present variation, the fuel gas flows into the long hole 81 from below through the gas intake 38 as indicated by arrow in FIG. 14. The fuel gas having flowed into the long hole 81 is restricted in its flowing into the gas passage 35 by a side surface portion (a restricting portion 80) of the long hole 81. The fuel gas is dispersed in the horizontal direction in the long hole 81, and thereafter flows into the respective gas passages 35.

(Third Variation)

Figure 15:
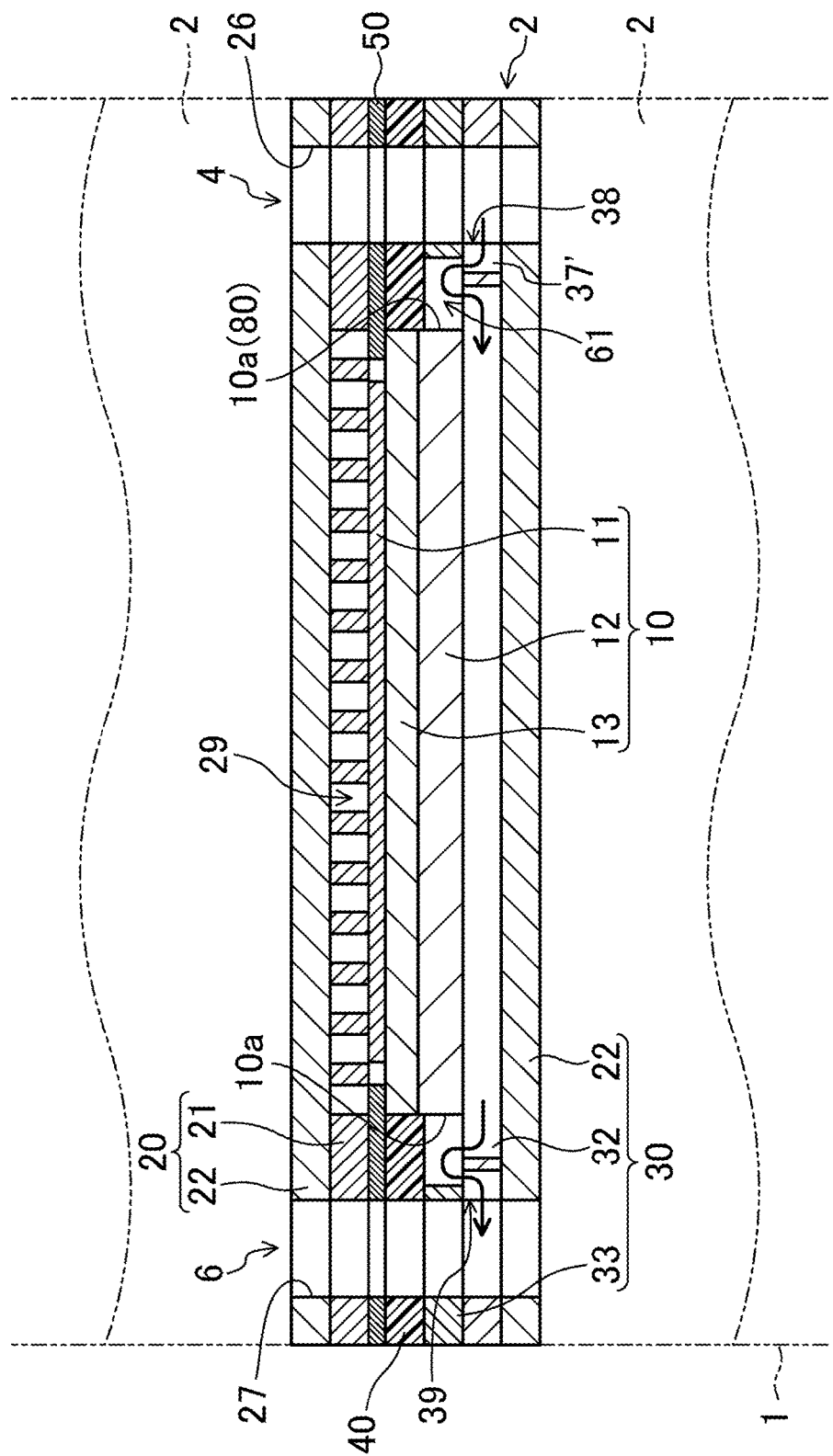
FIG. 15 illustrates a fuel cell of the third variation and is equivalent to FIG. 4. The gas passage is simply illustrated.

FIG. 15 illustrates a third variation of the fuel cell. In the present variation, part of the structure of the electrode-side plate 33 of the above-described second variation is changed.

In the third variation, the long hole 81 is not formed. Similarly to the above-described embodiment, the cell holding space 60 is formed to have larger dimensions than the cell 10, and a buffer space 61 (a second gas passage) is formed in the cell holding space 60 on the side closer to the fuel gas supply manifolds 4. The present variation is the same as the second variation in that the gas intake 38 is formed in the plane of the separator-side plate 32.

Thus, what forms the gas intake 38 in the present variation is not the notch 37 formed in the electrode-side plate 33, but the notch 37' formed in the separator-side plate 32. In this case, in the plane of the separator-side plate 32, the slits 34 (i.e., the gas passages 35) are not connected with the fuel supply holes 26 and the notches 37' (i.e., the gas intakes 38), and in the plane of the electrode-side plate 33, the fuel supply holes 26 and the cell opening 36 are not connected together.

In the present variation, the fuel gas flows into the buffer space 61 from below through the gas intake 38 as indicated by arrow in FIG. 15. The fuel gas having flowed into the buffer space 61 is restricted in its flowing into the gas passage 35 by the end face 10a (the restricting portion 80) of the cell 10, and is dispersed in the horizontal direction. The fuel gas thereafter flows into the respective gas passages 35.

The fuel cell of the present invention is not limited to the fuel cell described in the above embodiment, and may include various other configurations.

Figure 12:
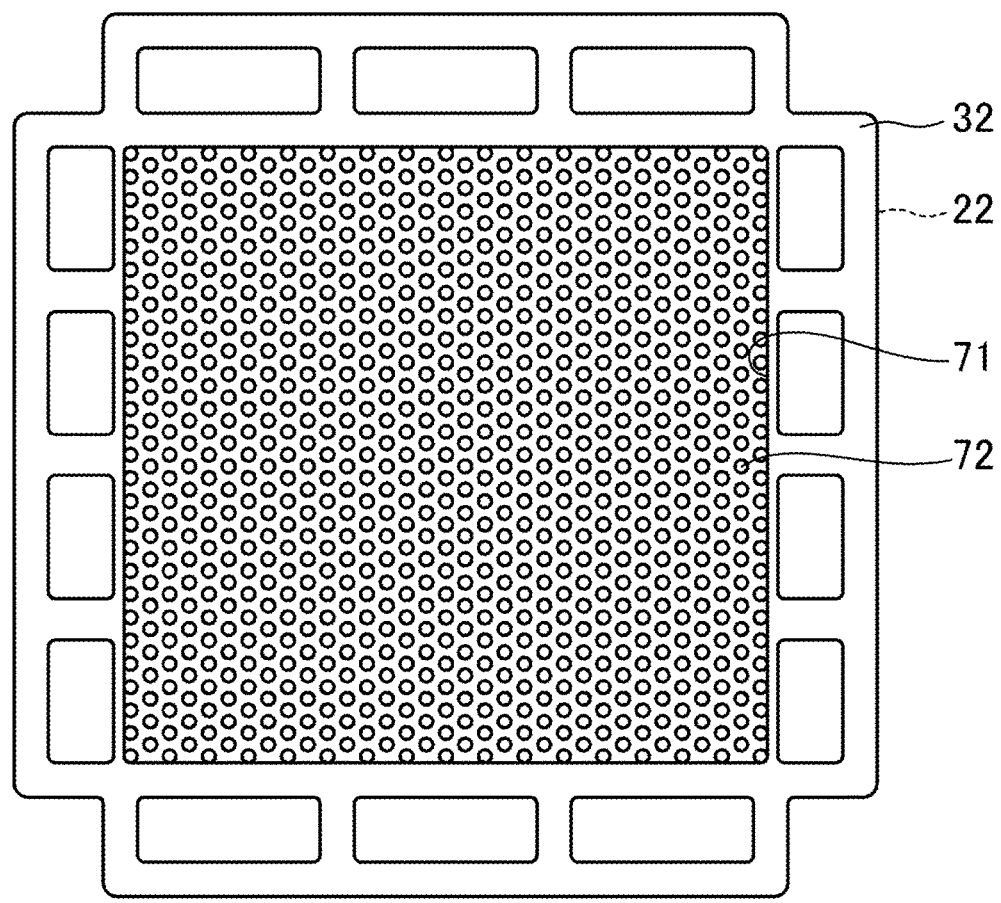
FIG. 12 schematically illustrates a variation of a gas passage.

The gas passages 35 do not necessarily have to be a group of narrow grooves. For example, as illustrated in FIG. 12, a plurality of dot-like projections 72 may be formed on a bottom surface of a rectangular recessed portion 71, and the fuel gas may flow in the space among the projections 72.

The configurations of the gas intake 38 are an example. The number and the shape of the gas intake 38 may be appropriately modified according to a specification. The structure of the fuel gas passage on the exhaust side may be different from the structure thereof on the supply side.

DESCRIPTION OF REFERENCE CHARACTERS 1 cell stack (fuel cell)
2 power-generating element
4 supply manifold (fuel supply manifold)
6 exhaust manifold
10 cell
10a end face
20 cathode plate
22 separator plate (first plate)
30 anode plate
32 separator-side plate (second plate)
33 electrode-side plate (third plate)
35 gas passage (first gas passage)
38 gas intake
40 insulating plate
60 cell holding space
61 buffer space (second gas passage)
80 restricting portion

The invention claimed is:

1. A fuel cell in which a plurality of power-generating elements are stacked together, the power-generating element comprising:
   a planar cell to one principal surface of which an anode component is connected and to the other principal surface of which a cathode component is connected;
   an anode plate stacked on the anode component to be electrically connected to the anode component; and
   a cathode plate stacked on the cathode component to be electrically connected to the cathode component,
   wherein:
      the anode plate comprises:
         a fuel supply manifold passing through the anode plate in a stacking direction to form a passage of a fuel gas, and arranged on an outer perimeter of the cell,
         a plurality of first gas passages arranged across the principal surfaces and extending from a side closer to the fuel supply manifold to a side closer to an end opposite to the fuel supply manifold with respect to the cell, a second gas passage arranged between the fuel supply manifold and the cell, the second gas passage extending to a same length as a width of the cell and across all the first gas passages such that the second gas passage is connected, in the stacking direction of the power-generating elements, with ends of the first gas passages that are open in the stacking direction, and a gas intake provided separately from the second gas passage and through which the fuel gas flows, from the fuel supply manifold and into the second gas passage, and a restricting portion is located along an opposed surface of the second gas passage, the opposed surface facing the gas intake, the restricting portion extending to the same length as the width of the cell, so as to restrict flowing of the fuel gas toward the first gas passages from the second gas passage, and so as to disperse the fuel gas, flowing into the second gas passage from the fuel supply manifold via the gas intake, in a longitudinal direction of the second gas passage.

2. The fuel cell of claim 1, wherein:
the first gas passages and the restricting portion are arranged at different heights in the stacking direction of the power-generating elements.

3. The fuel cell of claim 2, wherein:
the gas intake and the restricting portion are arranged at an approximately same height in the stacking direction of the power-generating elements.

4. The fuel cell of claim 1, further comprising:
an insulating plate provided between the anode plate and the cathode plate to electrically insulate therebetween, and having an opening for accommodating the cell,
wherein the cell is positioned in the power-generating element by making an end face of the cell contact an inner periphery of the opening.

5. The fuel cell of claim 1, wherein:
the restricting portion includes the end face of the cell.

6. The fuel cell of claim 1, wherein:
the opposed surface of the second gas passage, the opposed surface facing the gas intake, is included in the end face of the cell.

7. The fuel cell of claim 1, wherein:
the anode plate further comprises:
 a first plate provided with a fuel passage hole that forms the fuel supply manifold,
 a second plate provided with the fuel passage hole and first slits that form the plurality of first gas passages, and
 a third plate provided with the fuel passage hole, an opening for accommodating the cell, and a notch that forms the gas intake connecting the fuel passage hole and the opening,
the fuel passage hole is not connected with the first slits in a plane of the second plate, and
the anode plate comprises the first plate, the second plate, and the third plate sequentially stacked together such that the fuel passage holes of the respective plates are connected together in the stacking direction.

8. The fuel cell of claim 1, wherein:
the anode plate further comprises:
 a first plate provided with a fuel passage hole that forms the fuel supply manifold,
 a second plate provided with the fuel passage hole and first slits that form the plurality of first gas passages, and
 a third plate provided with the fuel passage hole, an opening for accommodating the cell, a second slit that is arranged between the fuel passage hole and the opening and forms the second gas passage, and a notch that forms the gas intake connecting the fuel passage hole and the second slit,
the fuel passage hole is not connected with the first slits in a plane of the second plate,
the second slit is not connected with the opening in a plane of the third plate, and
the anode plate comprises the first plate, the second plate, and the third plate sequentially stacked together such that the fuel passage holes of the respective plates are connected together in the stacking direction.

9. The fuel cell of claim 1, wherein:
the anode plate further comprises:
 a first plate provided with a fuel passage hole that forms the fuel supply manifold,
 a second plate provided with the fuel passage hole, a notch that is connected with the fuel passage hole and forms the gas intake, and first slits that form the plurality of first gas passages, and
 a third plate provided with the fuel passage hole, an opening for accommodating the cell, and a second slit that is arranged between the fuel passage hole and the opening and forms the second gas passage,
the first slits are not connected with the fuel passage hole and the notch in a plane of the second plate,
the fuel passage hole, the second slit, and the opening are not connected with each other in a plane of the third plate, and
the anode plate comprises the first plate, the second plate, and the third plate sequentially stacked together such that the fuel passage holes of the respective plates are connected together in the stacking direction.

10. The fuel cell of claim 1, wherein:
the anode plate further comprises:
 a first plate provided with a fuel passage hole that forms the fuel supply manifold,
 a second plate provided with the fuel passage hole, a notch that is connected with the fuel passage hole and forms the gas intake, and first slits that form the plurality of first gas passages, and
 a third plate provided with the fuel passage hole and an opening for accommodating the cell,
the first slits are not connected with the fuel passage hole and the notch in a plane of the second plate,
the fuel passage hole is not connected with the opening in a plane of third plate, and
the anode plate comprises the first plate, the second plate, and the third plate sequentially stacked together such that the fuel passage holes of the respective plates are connected together in the stacking direction.

* * * * *